June 23, 1964  D. J. FARMER  3,138,739
ELECTRODELESS LAMP HAVING A SHEATHED PROBE
Filed Dec. 26, 1961
Fig. 1
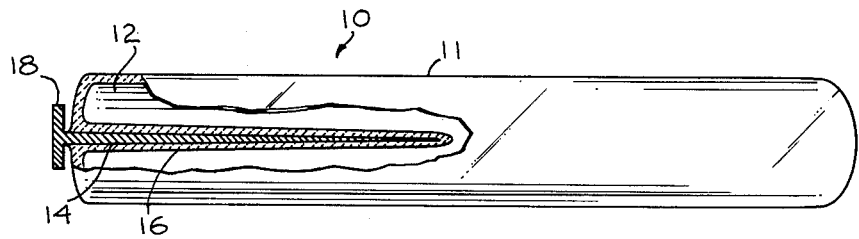
Fig. 2
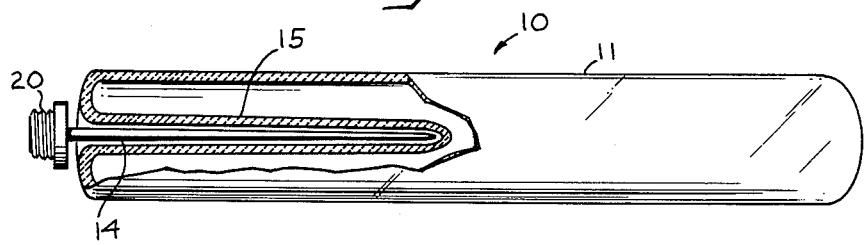
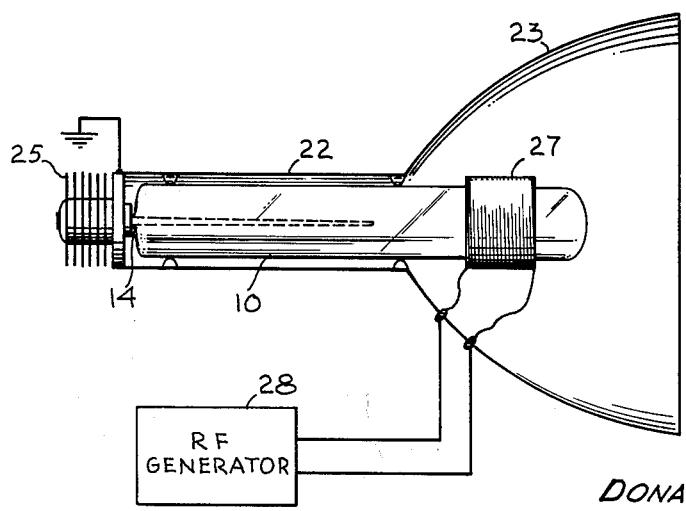
Fig. 3
DONALD J. FARMER
INVENTOR.
BY Fraser and Bogucki
ATTORNEYS

United States Patent Office 3,138,739
Patented June 23, 1964

3,138,739
ELECTRODELESS LAMP HAVING A
SHEATHED PROBE
Donald J. Farmer, Pacific Palisades, Calif., assignor to General Technology Corporation, a corporation of California
Filed Dec. 26, 1961, Ser. No. 161,843
11 Claims. (Cl. 315—248)

This invention relates to a discharge tube and more particularly to a tube in which the discharge is induced by an externally applied electromagentic field.

Discharge tubes are useful as optical pumping lamps in connection with gas cell type atomic frequency standards, magnetometers, atomic gyroscopes, and the like. Such discharge tubes usually contain a small amount of alkali metal, vapor from which is electrically excited to obtain the optical pumping radiation, together with additional gases of composition and pressure appropriate to the needs of starting and maintaining the discharge and to produce other desirable characteristics. One arrangement for energizing such a discharge tube is to apply an electromagnetic field at radio frequency from a solenoid surrounding at least a portion of the tube and energized by a radio frequency generator. Such discharge tubes have been referred to in the past as being of the electrodeless type because of the fact that the discharge is established and maintained without the dependence upon electrodes within the discharge portion of the tube.

Certain disadvantages have been found to result from the above described arrangement for energizing a discharge tube. For one thing the alkali metal tends to condense and migrate about in the tube. The presence of the alkali distorts the applied electromagnetic field and thus changes the intensity or character of the optical radiation generated by the discharge tube. Such variations in the generated radiation are generally considered as "noise" especially in view of the fact that they are undesirable and they occur with certain randomness. One previously known arrangement for meeting this problem involves the introduction of a metal electrode into a suitable region in the interior of the discharge tube. While this electrode is not used directly in the initiation or maintenance of the electrical discharge within the tube, it produces a stabilizing effect upon the discharge by virtue of the fact that the electrode concentrates the field more symmetrically within the tube and further that it provides a thermal sink within the tube at which any condensation of the alkali metal will concentrate, thus eliminating the unwanted alkali deposits heretofore mentioned. In practice this method has proved disadvantageous in that the metal electrode slowly disintegrates or reacts with the liquid alkali, thus causing a deterioration of the desired properties of the discharge tube. Accordingly, while the introduction of a metal electrode within the discharge tube tends to solve one hitherto existing problem, it produces another problem which counterbalances its effectiveness and renders such an arrangement unfeasible in practice.

It is an object of this invention to provide an improved discharge tube arrangement.

It is a further object of this invention to provide an improved discharge tube arrangement including a discharge stabilizing element.

More particularly it is an object of this invention to provide a discharge tube arrangement incorporating a thermally conducting probe as a discharge stabilizing element without the possibility of physical interaction between the stabilizing element and the constituents of the discharge tube.

Briefly, arrangements in accordance with the present invention relate to a discharge tube of an alkali metal vapor type in which a suitable probe is injected but separated from the discharge portion of the tube by a thin coating of an inert material to prevent reaction between the liquid alkali within the tube and the material of the probe itself. In accordance with an aspect of the invention, the probe is fabricated of a suitable material exhibiting appropriate heat conducting properties so that the probe may function as an effective heat sink. The probe may comprise a heat conducting metal or any other substance exhibiting sufficiently good thermal conductivity. In the described arrangements of the invention the probe is shaped to permit connection to an external heat dissipating element which may be electrically grounded or maintained at a desired electrical potential so as to produce stabilization of the electrical discharge by concentrating the field in the vicinity of the probe within the discharge tube and by condensing the alkali vapor in a way which eliminates the coalescence of the liquid alkali at places within the tube where its presence would tend to distort the applied field. In one arrangement in accordance with the invention, a metal probe electrode is embedded within the tube during fabrication thereof so that the probe becomes coated with a thin sheath of glass within the tube itself. In an alternative arrangement in accordance with the invention, the discharge tube may be formed in the shape of a reentrant tube with a metal probe positioned in the resultant cavity.

A better understanding of the invention may be had from a consideration of the following detailed description, taken in conjunction with the accompanying drawing, in which:

FIG. 1 is a representation, partially cut away, of one particular arrangement in accordance with the invention;

FIG. 2 is a view, partially cut away, of another particular arrangement in accordance with the invention; and FIG. 3 is a representation of apparatus for operating arrangements in accordance with the invention as shown in FIGS. 1 and 2.

In FIG. 1, which is a pictorial representation of one particular arrangement in accordance with the invention, there is shown a discharge tube 10 which may advantageously comprise a glass envelope 11. The envelope 11 is shown partially cut away to show a space 12 and an electrode 14. The space 12 enclosed by the envelope 11 may contain a small amount of alkali metal, the vapor from which is electrically excited to obtain optical pumping radiation, together with additional gases of such composition and pressure as are appropriate to the needs of starting and maintaining the desired discharge in stable operation. In accordance with the invention, a probe 14, ensheathed in a thin coating of glass 16, is introduced into a suitable region disposed in the interior of the discharge tube 10. As shown in FIG. 1, the probe 14 has an elongated section to which is attached a flattened portion 18 which may be placed against a thermally conductive surface to conduct heat from the tube in an efficient manner so as to serve as a heat sink. The portion 18 may also be employed, where such is desired, to maintain the probe 14 and the associated portion of the tube 10 at a selected temperature in order to achieve enhanced operation of the discharge tube arrangement. At the same time the electrical potential of the probe 14 may be maintained at a suitable voltage in order to stabilize the discharge within the tube 10. In the arrangement shown in FIG. 3, the probe 14 is maintained at ground potential, but any suitable voltage may be connected thereto. By virtue of this arrangement in accordance with the invention, the alkali metal vapor within the space 12, which would otherwise tend to condense in various spots along the interior of the envelope 11, instead condenses on the coating 16 adjacent the slender portion of the probe 14 by virtue of the heat sink effects developed by the cooling of the probe 14. In this way the desired configuration of the discharge tube 10 and the constituents within the space 12 are preserved, thus effecting a useful stabilization of the radio frequency discharge which is generated within the tube 10. These advantageous results are achieved without any possibility of the probe 14 disintegrating or physically reacting with the alkali metal or other constituents within the space 12. As a result there is no deterioration of the useful properties of the discharge tube 10 and the desired results of employing the probe 14 in this arrangement are maintained substantially indefinitely.

In FIG. 2 another particular arrangement in accordance with the invention is shown having a stabilizing probe 14 arranged in conjunction with a discharge tube 10. In FIG. 2, however, the discharge tube 10 is formed with a re-entrant portion 15 in which the probe 14 may be inserted. The probe 14 of the arrangement of FIG. 2 is shown having a threaded end 20 which may be coupled to a suitable base for affixing the probe 14 in position and for improving the transfer of heat between the probe 14 and an attached substantially constant temperature element 25 which is shown in FIG. 3.

FIG. 3 is a representation of apparatus for utilizing the arrangements of FIGS. 1 or 2 and illustrates in cross section a housing 22, part of which is in the shape of a parabolic reflector 23. The discharge tube 10 as shown in either of FIGS. 1 or 2 is placed within the housing 22 where it may be held by suitable retaining means such as spring clips or resilient rings. At the base of the housing 22 there is shown a finned cooling element 25 to which the butt end of the thermally conductive probe 14 may be coupled for efficient heat transfer to the surrounding environment. Surrounding the forward portion of the tube 10 is a solenoid 27 which is connected to an RF generator 28. In the operation of this apparatus, the RF generator is driven to provide electromagnetic energy at a suitable frequency to the solenoid 27. The solenoid 27 generates within the discharge tube 10 an electromagnetic field which serves to ionize the alkali metal vapor and produce the desired discharge. The purpose and function of the probe 14 in this arrangement are as have already been described in connection with the arrangements of FIGS. 1 and 2.

Although there have been described above specific arrangements of a discharge tube in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. A discharge tube comprising a sealed vessel containing an alkali metal vaporized at least in part and arranged to support an electric discharge under the influence of an externally applied electromagnetic field, and a coated thermally conductive probe inserted in said vessel and connected to an external temperature controlling means, said probe having a coating of an inert material separating the probe from the contents of the sealed vessel.

2. A discharge tube comprising a sealed vessel containing an alkali metal vaporized at least in part and arranged to support an electric discharge under the influence of an externally applied electromagnetic field of radio frequency, and means for stabilizing the frequency of said electric discharge comprising a thermally conductive probe disposed within said vessel but separated from the interior of said sealed vessel by a thin coating of an inert material.

3. An alkali metal vapor lamp comprising a discharge tube in the form of a sealed vessel containing an alkali metal vaporized at least in part and arranged to support an electric discharge under the influence of an externally applied electromagnetic field, stabilizing means in the form of a coated metallic probe inserted into the interior of said vessel but separated from a contained vapor by a thin glass coating, and cooling means coupled to the probe for providing a thermal sink at a predetermined position in said discharge tube.

4. An alkali metal vapor lamp comprising a discharge tube in the form of a sealed vessel containing an alkali metal vaporized at least in part, means for establishing a varying electromagnetic field within at least a portion of said discharge tube in order to produce an electric discharge therein, driving means coupled to said field establishing means, and means for stabilizing the frequency of said discharge comprising a conductive probe partially inserted within said discharge tube, said probe being coated with a thin glass sheath.

5. An alkali metal vapor lamp comprising a discharge tube in the form of a sealed vessel containing an alkali metal vaporized at least in part, a solenoid encompassing at least a portion of said discharge tube for generating a varying electromagnetic field within said tube in order to produce an electric discharge therein, driving means coupled to said solenoid, discharge stabilizing means including an elongated metal probe partially inserted within said discharge tube, said probe being separated from the contents of said sealed vessel by a thin glass wall, means for maintaining the temperature of said probe at a selected level, and means for maintaining the electrical potential of the probe at a selected voltage.

6. An alkali metal vapor lamp in accordance with claim 5 wherein said metal probe is embedded within a glass sheath extending from one end of said sealed vessel.

7. An alkali metal vapor lamp in accordance with claim 5 wherein said sealed vessel comprises a re-entrant tube and wherein said probe is shaped for insertion within the re-entrant tube portion of said sealed vessel.

8. An alkali metal vapor lamp in accordance with claim 7 wherein said probe includes a threaded portion at the outer end thereof for attachment to a mounting base.

9. A gaseous discharge tube of the electrodeless type comprising a sealed vessel in which an electric discharge at a selected frequency may be established by an externally applied electromagnetic field and having an elongated heat conducting element extending partially into said sealed vessel, said element being coated with a thin sheath of an inert material to prevent reaction between the material of the element and the constituents of the discharge region within the sealed vessel.

10. A gaseous discharge tube in accordance with claim 9 wherein the sealed vessel is in the form of a re-entrant tube with the heat conducting element removably positioned within the re-entrant portion thereof.

11. A gaseous discharge tube in accordance with claim 9 wherein the heat conducting element is embedded within the glass portion of the sealed vessel.

References Cited in the file of this patent
UNITED STATES PATENTS

| | | |
|---|---|---|
| 1,698,691 | Buttolph | Jan. 8, 1929 |
| 2,974,243 | Marrison | Mar. 7, 1961 |